Figure 1:
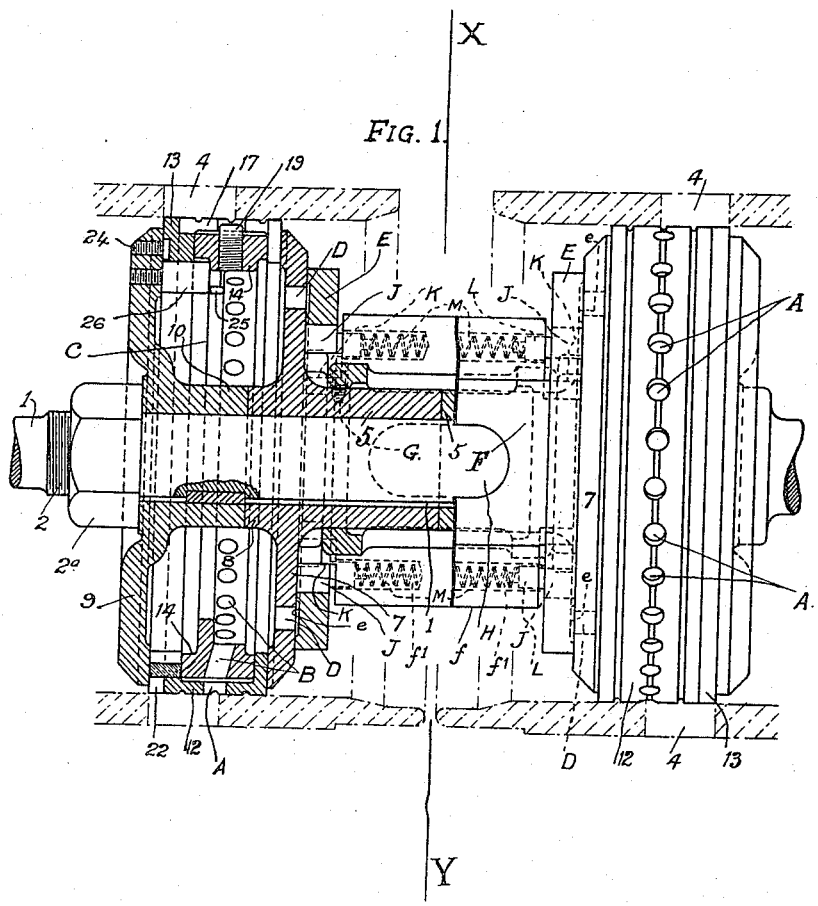

J. G. ROBINSON.
PISTON VALVE FOR LOCOMOTIVES.
APPLICATION FILED MAR. 16, 1915.

1,169,286.

Patented Jan. 25, 1916.
2 SHEETS—SHEET 1.

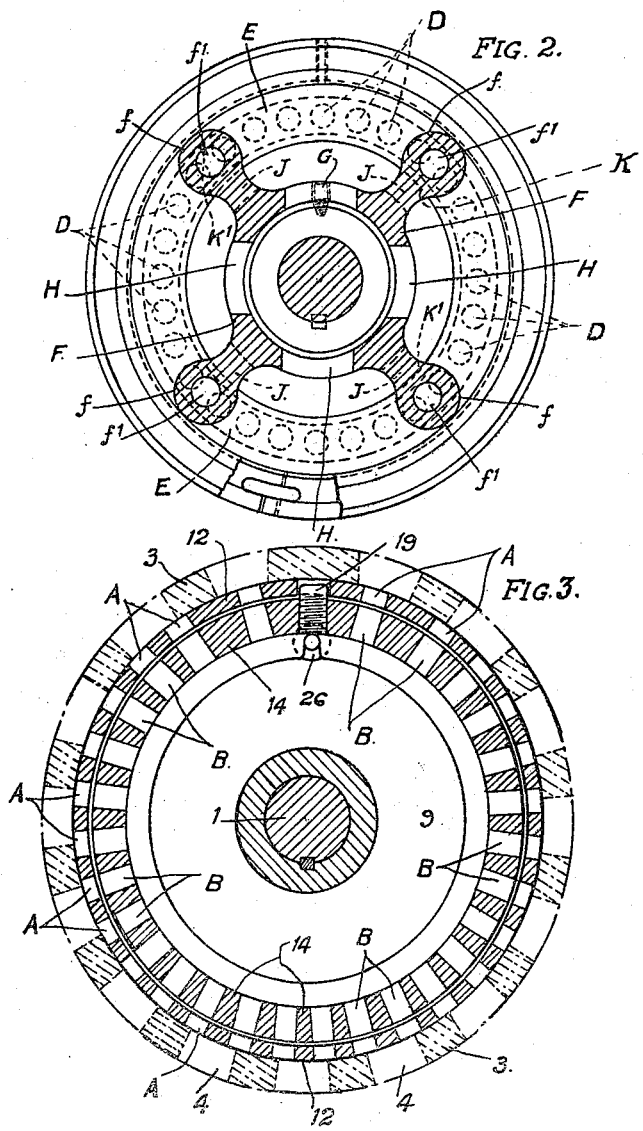

UNITED STATES PATENT OFFICE.

JOHN GEORGE ROBINSON, OF MANCHESTER, ENGLAND.

PISTON-VALVE FOR LOCOMOTIVES.

1,169,286.   Specification of Letters Patent.   Patented Jan. 25, 1916.

Application filed March 16, 1915. Serial No. 14,869.

*To all whom it may concern:*

Be it known that I, JOHN GEORGE ROBINSON, a subject of the King of Great Britain and Ireland, residing at Manchester, in the county of Lancaster, England, (whose post-office address is "Boothdale," Fairfield, Manchester, in the county of Lancaster, England,) have invented certain new and useful Improvements in Piston-Valves for Locomotive and other Engines; and I do hereby declare the following to be a full, clear, and exact description of the invention, such as will enable others skilled in the art to which it appertains to make and use the same.

This invention relates to improvements in piston valves, for locomotive and other engines, constructed or provided with means so that the valve is adapted to act also as a pressure release valve for the relief or release of excessive pressure or of compression set up in the engine cylinder at the end of the stroke.

The present invention has for its object improvements in valves of the type above indicated, the construction and arrangement being such that the relief valve gives a maximum of outlet with a minimum of travel or lift thereby limiting the impact of the valve on the valve seat and preventing so called "chatter," and consequently reducing wear of the parts.

The invention is applicable to piston valves arranged either for inside steam admission, *i. e.* in which live steam is admitted to the space in the valve chamber or cylinder steam chest between the two pistons or heads of the piston valve, or to piston valves arranged for outside steam admission, *i. e.* in which live steam is admitted to the spaces in the valve chamber at the outer ends or sides of the valve pistons. Further, in a piston valve arranged for inside steam admission, according to this invention the hereinbefore mentioned supporting and guiding means for the above-mentioned release valves consists of projections formed on the ends of a "spider," which may be made of cast iron, having a tubular body portion adapted to bear on the valve spindle or on tubular bosses on the end plates or disks of the valve pistons, the said projections contacting with or bearing against the end disks or plates on the live steam side thereof. The length of these end projections on the spider is slightly in excess of the thickness of the above-mentioned rings constituting the release valves so that the rings can move axially thereon, to the required extent, in relation to the valve spindle, radial projections being provided on the "spider" for limiting such movement.

Further features of the invention will appear from the following description with reference to the accompanying drawing which illustrates, by way of example, a piston valve arranged for inside steam admission, *i. e.* in which live steam is supplied to the space in the valve chamber between the two pistons of the valve.

Figure 1 is an elevation, partly in section, of a piston valve embodying the present invention. Fig. 2 is a cross-section on the line X—Y Fig. 1 with the liner of the valve chamber omitted. Fig. 3 is a transverse section through the packing rings of the piston valve and through the liner of the valve chamber showing the usual ports in the liner and the radially arranged holes or ports in the packing rings of the valve piston.

Like reference numbers and letters indicate corresponding parts in the several figures.

For the sake of convenience the general construction of the piston valve shown is the same as that described and illustrated in the prior specification of British Letters Patent No. 25656/1911 granted to me, *i. e.* each piston of the valve comprises an outer end disk or plate 9 and an inner end disk or plate 7 between which plates or disks are placed the main split spring packing ring 12, the split spring follower or exhaust ring 13 and the inner solid distance ring 14.

1 is the valve spindle with externally screwed portion 2 on which the nut 2ª is screwed up so as to hold the plates 9 and 7 with their bosses, respectively 10 and 8, tightly together.

17 is the split in the main packing ring 12 and 22 the split in the follower or exhaust ring 13.

19 is the pin or stud screwed into the solid ring 14 the head or outer end of the said pin engaging in semi-circular grooves formed in the main packing ring 12 at the split thereof, the pin 19 acting to retain the packing ring 12 in position.

24 is a pin or stud the head of which engages in a recess or hole formed in the face of the exhaust or follower ring 13 so as to prevent displacement of the said ring.

26 is a pin the end of which engages in the hole 25 in the rib or flange of the solid distance ring 14.

The above-mentioned pins or studs 24 and 26 are screwed into the end disk or plate 9 of the valve piston.

4, 4 are the usual ports in the liner 3 of the valve chamber for the admission and exhaust of steam to and from the engine cylinder.

Although both pistons of the valve as thus far described are identically the same as described and shown in the above-mentioned prior specification No. 25656/1911, it is to be distinctly understood that the features of the present invention are not limited to this particular construction of piston valve.

According to the present invention a number of radially arranged holes or ports A of relatively large size are provided at suitable intervals in the main packing ring 12 the said holes as shown being arranged around the packing ring in a common vertical plane, and a corresponding number of similar holes or ports B are provided in the solid distance ring 14, the holes or ports A and B registering with each other and forming a through passage from the exterior of the main packing ring 12 to the cavity or chamber C within the valve piston. In the case where only a single packing ring is employed, or where the inner solid distance ring 14 is dispensed with, the holes A would of course alone form the means of communication between the outer periphery of the packing ring and the chamber within the valve piston.

D are relatively large holes or ports extending through the end disk or plate 7 situated on the live steam admission side of the valve piston, a suitable number of these holes or ports being arranged in a circle as clearly shown in Fig. 2, the said holes D forming communication between the chamber C within the valve piston and the live steam admission space within the valve chamber.

E is a solid ring, preferably of steel, and of such a size that when in contact with the end disk or plate 7 the face of the said ring adjacent the plate 7 effectively covers the holes D which are thus closed on the live steam side. The contacting faces of the ring E and end disk or plate 7 are machined so that when in contact a good steam tight joint is made.

e is an annular groove in the face of the ring E adjacent to the end disk or plate 7. The groove e in the face of the annular relief valve E forms two seats at the edges of the valve which bear against the end plate 7 of the piston valve on opposite sides of the holes D. The valve E is arranged outside the chamber C of the piston valve, and in the pressure space of the valve casing where its back is exposed to the pressure of the steam supply.

F is the hereinbefore mentioned spider or distance piece which may be of cast iron and as shown is provided with a tubular body portion by which the said spider is mounted on the tubular bosses (marked 5 in Fig. 1) of the end plates 7 of the valve pistons, G (Fig. 2) being a small screw or stud which is screwed into one of the bosses 5 and by its outer end engaging in a hole or recess in the tubular body of the spider F prevents rotation of the spider relatively to the valve spindle. In the case where the end plates 7 are not provided with tubular bosses, such as 5, the tubular body portion of the spider F would be mounted directly on the valve spindle 1.

f are radial arms or projections on the spider F and $f^1$ are holes or recesses formed in said arms f.

H are holes formed in the tubular body portion of the spider F in order to reduce the weight of the spider.

J are lugs or projections on each end of the spider F, the ends of the said projections being in contact with the end disks or plates 7 of the valve pistons as shown in Fig. 1. The outer surfaces of the projections J, on which the inner periphery of the ring E bears or rests, are curved at K (Fig. 2) to correspond to the inner periphery of the ring E. The ends of the radial projections f in which the recesses $f^1$ are formed act as stops or abutments to limit the movements of the rings E away from the end disks or plates 7 of the valve pistons. Other stops for the same purpose might, if desired, be provided.

The rings E in conjunction with the hereinbefore mentioned radially arranged ports A and B, (or A only if the solid distance ring 14 is dispensed with) and the axially arranged ports D, act as pressure relief or release valves in the manner hereinafter described.

L (Fig. 1) are small plungers slidable in the recesses $f^1$ in the arms of the spider, and M are light springs pressing the plungers L into contact with the annular relief valves E. These plungers L with their backing springs M act as buffers or shock absorbing devices for reducing shock and noise in the working of the valves E when these valves are forced away from the end disks or plates 7 of the heads or pistons of the piston valve. The employment of these plungers L and springs M is however not essential to the working of the release valves E for the purposes for which these valves are provided.

Whenever, in the running of the engine, (i. e. whether running with the regulator open and steam on or with the regulator closed and steam off) pressure of air, steam or other fluid is set up in the engine cylinder, between the piston and the cylinder end, to a degree exceeding the pressure existing in the cylinder steam chest, such steam, air or fluid will, the above mentioned radially arranged ports A being at such time opposite the ports 4 in the liner of the valve chamber, escape from the engine cylinder through the ports 4 in the liner, through the radially arranged ports A and B into the cavity or chamber C in the valve piston and thence through the holes or ports D in the end disks or plates 7 the pressure of the escaping fluid forcing the hereinbefore mentioned axially movable rings or annular valves E away from the end disk or plate 7, thus allowing the fluid to escape through the holes or ports D to the live steam space in the cylinder steam chest between the two pistons or heads of the valve and thence to the main steam pipe line.

It will be understood that when excessive pressure or compression is set up in the engine cylinder at the end of the stroke only one of the above-mentioned annular valves E will be moved away from the end disk or plate 7 of the piston valve i. e. the valve E coöperating with that piston head of the piston valve which at such time (i. e. when excessive pressure is set up) is in position with the radial ports A in its packing ring or periphery opposite the ports 4 communicating with the engine cylinder.

It will be seen that each of the above-mentioned rings E acts as a double discharge valve for release of fluid under excessive pressure set up in the respective ends of the engine cylinder, the fluid escaping through the ports D past both the outer and inner peripheries of the rings or valves E. Further the construction is such that with only a small movement of the valves E any excessive pressure, or compression, is immediately released.

With this invention the valve controlled by-pass pipe communicating with each end of the engine cylinder, or pressure release or priming valves connected with the ends of the cylinders, as heretofore usually employed for the purpose of relieving excessive pressure set up between the piston and the ends of the engine cylinder, are done away with thus considerably reducing initial and maintenance costs.

What I claim as my invention and desire to secure by Letters Patent is:—

1. A valve casing provided with a cylinder supply port, a piston valve controlling the supply port, said piston valve being provided with a chamber having an inlet for communicating with the said supply port and having a series of outlet holes for communicating with the pressure space of the valve casing; and an annular relief valve arranged outside the chamber of the piston valve in the pressure space of the valve casing and provided with seats at its edges which normally close the series of outlet holes, said relief valve opening automatically when the pressure on its face between its said seats exceeds that on its back in the pressure space.

2. A valve casing provided with cylinder supply ports, two piston valves controlling the said supply ports, each piston valve being provided with a chamber having an inlet for communicating with one of the supply ports and having a series of outlet holes for communicating with the pressure space of the valve casing, a distance-piece arranged in the said pressure space between the two piston valves, and two annular relief valves arranged outside the chambers of the piston valves in the said pressure space and provided with seats at their edges which normally close the said series of outlet holes, said relief valves opening automatically when the pressure on their faces between their said seats exceeds that on their backs in the said pressure space.

In testimony whereof I have affixed my signature, in presence of two witnesses.

JOHN GEORGE ROBINSON.

Witnesses:
W. H. LEWERS,
W. H. TINSON.

Copies of this patent may be obtained for five cents each, by addressing the "Commissioner of Patents, Washington, D. C."